United States Patent [19]

Hoen

[11] 4,213,230
[45] Jul. 22, 1980

[54] ROTATABLE LOCKING FASTENER

[75] Inventor: Cuyler Hoen, Rennesselaer, N.Y.

[73] Assignee: Simmons Fastener Corporation, Albany, N.Y.

[21] Appl. No.: 920,842

[22] Filed: Jun. 30, 1978

[51] Int. Cl.² .................. A44B 17/00; F16B 21/07
[52] U.S. Cl. ............................. 24/217 R; 24/221 R
[58] Field of Search .......... 24/230 TC, 221 R, 221 A, 24/217 R, 73 RM; 292/19; 85/5 P

[56] References Cited

U.S. PATENT DOCUMENTS

| | | | |
|---|---|---|---|
| 1,472,242 | 10/1923 | Covi | 24/221 R |
| 1,775,042 | 9/1930 | Lenoine | 24/221 A |
| 1,967,627 | 7/1934 | Riley | 24/221 R |
| 2,200,702 | 5/1940 | Oddie | 24/221 A |
| 2,454,223 | 11/1948 | Shippee | 24/221 A |
| 2,486,003 | 11/1949 | Christensen | 24/217 |
| 2,552,066 | 5/1951 | Sorensen | 24/221 A |
| 2,668,998 | 2/1954 | Tinnerman | 24/217 |
| 3,080,633 | 3/1963 | Reddy | 24/221 R |

*Primary Examiner*—Roy D. Frazier
*Attorney, Agent, or Firm*—Eliot S. Gerber

[57] ABSTRACT

A releasable locking fastener for industrial applications comprises a turn member which may be rotatably attached to a first panel and a receptacle member which may be fixedly attached to a second panel. The turn member includes cap and stud members which are fixed together to form a unitary member, a means for resiliently and rotationally positioning the turn member with respect to the first panel, and a means for securing the turn member to the first panel. The stud member is a unitary member, preferably formed from sheet metal, which includes a laterally disposed head portion, a body portion, and a nose portion. The receptacle member comprises a base having two downwardly projected spring flanges, an opening and a means for securing the receptacle member to the second panel.

6 Claims, 16 Drawing Figures

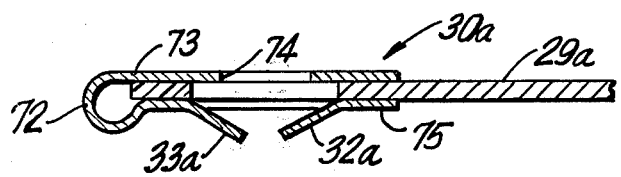
FIG.11
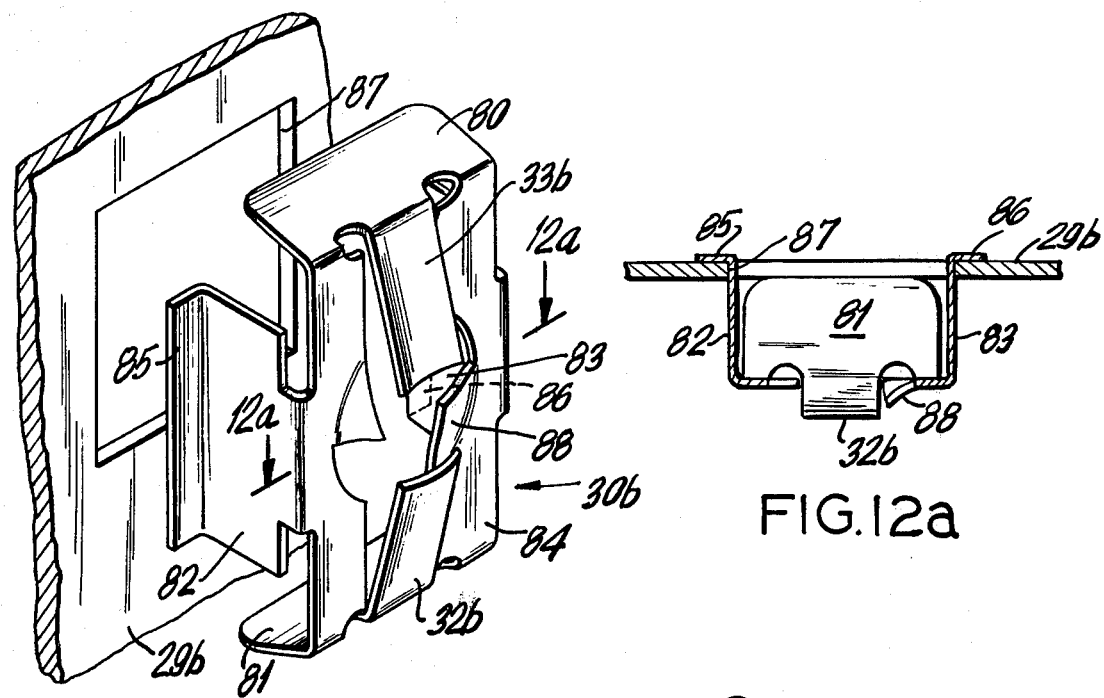
FIG.12  FIG.12a
FIG.13
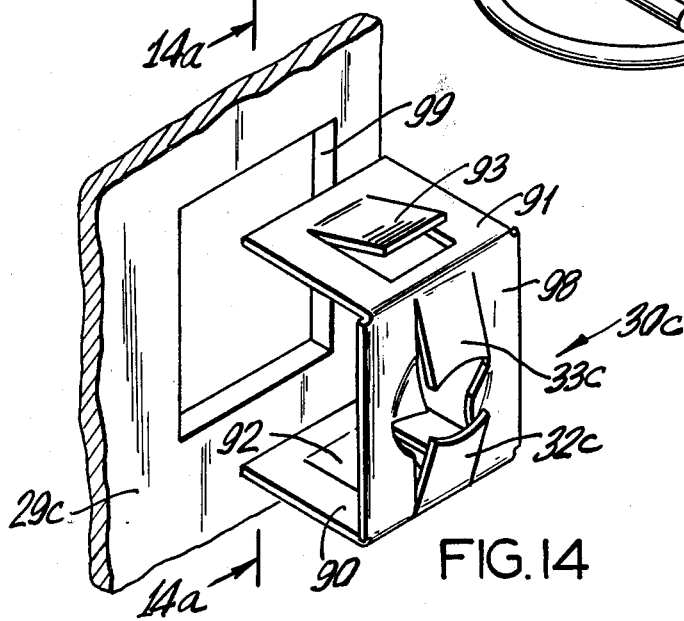
FIG.14
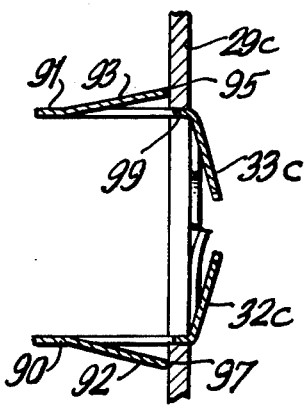
FIG.14a

ROTATABLE LOCKING FASTENER

BACKGROUND OF THE INVENTION

The present invention relates to industrial fasteners and more particularly to those industrial fasteners which are used to removably secure two panels. The panels may be flush mounted service or enclosure panels which are readily opened and closed. For example, one panel may be the door of a domestic automatic washing machine and the other panel its door frame. The fastener of the present invention is particularly well suited for assembling curved sheets such as engine cowlings or flat sheets such as access panels and may accommodate slightly misaligned holes in the panels to be joined.

At the present time a number of industrial fasteners are commercially available which releasably secure two panels. Many additional types of such fasteners have been proposed in prior patents. Generally such fasteners will operate and lock only when the panels to which they are fastened are completely joined or almost completely joined.

Generally, industrial fasteners of this type consist of two separate members each of which may be attached to an individual panel. One panel might be a machine wall or frame to which the receptacle member is attached. The other panel might be the service, inspection or enclosure panel to which the stud member is attached. Panel attachment by this type of fastener provides for tight, easily perfected seals, which additionally are easily released to provide for quick access to the enclosure.

Fasteners of this type comprise a stud member which acts in combination with a receptacle member having retention jaws. As described in U.S. Pat. No. 2,562,056 to O. E. Norberg et al and U.S. Pat. No. 1,302,390 to A. J. Lobar, a cylindrical stud engages the receptacle jaws irrespective of the stud rotational disposition. Disengagement of the stud member from the receptacle member is accomplished by exerting an outwardly directed pulling force on both the stud and the receptacle as the stud is rotated back and forth.

U.S. Pat. No. 3,718,950 to J. B. Engstrom discloses a fastener which comprises a notched stud member having a turn member head which is encased in a spring-biased socket. The stud member is held against the receptacle jaws by spring tension. Rotation of the stud produces a cammed broadening of the receptacle jaws, enabling the stud to be withdrawn.

U.S. Pat. No. 2,552,006 to C. P. Sorensen and U.S. Pat. No. 2,486,003 to D. Christensen disclose fasteners whose stud noses are rectangular in cross-section. In Christensen externally tensioned receptacle jaws hold the stud in combination with the receptacle and in Sorensen the stud is held by spring flanges. Rotation of the stud disengages the stud from the jaws, permitting the stud to be separated from the receptacle. In the Sorensen patent the serrated stud grooves contact the receptacle jaws, thus suspending inadvertent rotational stud movement (col. 4, lines 8–12). Additionally the chamfered stud nose aids in stud-receptacle alignment. Similarly the Christensen patent discloses a tension spring and manual pull cord combination which prevents the stud from rotationally disengaging the receptacle jaws, while a compression spring holds the stud vertically against the receptacle jaws.

The presently available commercial fasteners are satisfactory for many purposes; however, there is a need for a rugged, easily operable, self-aligning fastener which permits partial closure of panels in a locking position and is relatively inexpensive to produce and install.

FEATURES AND OBJECTIVES OF THE INVENTION

It is an objective of the present invention to provide a fastener in which a turn member on one panel locks to a receptacle on another panel even though the two panels are only partially closed.

It is another objective of the present invention to provide such a fastener in which the turn member is automatically returned to its centered position after complete separation of the panels so that the panels may be locked together by simply joining the panels and without manual operation of the turn member.

It is a further objective of the present invention to provide such a fastener which will remain locked, and maintain the panels together, until the turn member is manually rotated a predetermined distance and the panels are simultaneously separated.

It is a further objective of the present invention to provide such a fastener which, if the panels are somewhat separated, will lock them together and yet permit the panels to be further or fully closed and which will lock the panels in such further or fully closed positions.

It is a feature of the present invention to provide a fastener which will lock even though the two panels are only partially closed. The fastener comprises a turn member which is permanently and rotatively attached to a first panel and a receptacle which is attached to a second panel. The turn member comprises a stud member and a cap member including a turning means. The turning means may be easily gripped by hand or appropriate tool such as a plier. The stud member includes a laterally disposed head portion which frictionally fits the cap member, a body portion which may have serrated edges and cooperates with the receptacle flanges, and a rounded nose portion which, in addition to being a safety precaution, facilitates insertion of the turn member through the receptacle opening.

The turn member further comprises a turn member positioning means which may be a clock or ribbon-type spring. The positioning means is connected between the cap and the first panel to provide a pre-specified centered return, i.e., a rotational orientation of the turn member such that the stud body portion will be aligned to engage the receptacle jaws. Additionally, the turn member positioning means provides a continuous force which opposes rotation of the turn member in either direction.

The turn member further comprises a first panel attachment means which is affixed to the stud member, such as a stamped or a formed "C" clip. The turn member is inserted through the first panel and then the attachment means is secured to the stud body portion, causing the turn member to be permanently yet rotatively attached to the first panel.

The receptacle member comprises, in general, a base having a cross-shaped opening therein and a plurality of downwardly articulated jaw flanges which cooperate with the turn member. The receptacle further includes a means for fastening it to the second panel.

SUMMARY OF THE INVENTION

The present invention provides a locking industrial fastener in which a turn member is attached to a first panel and a receptacle is attached to a second panel. The user may lock or unlock the fastener by rotation of the turn member. The turn member particularly comprises a stud, a cap including turning means, a turn member positioning means and a first panel attachment means.

The stud member is a flat shaped member which may be stamped from sheet metal. The stud member is a unitary member having a laterally articulated head portion, for example, in the form of the top of a "T," a body portion and a rounded nose. The head portion is fixed to the cap base portion to form a single unitary turn member comprising both the stud and cap members. The body portion is greater in length than in width and may have serrated edges. The serrations cooperate with the receptacle flanges to provide a plurality of lock positions, enabling the panels to be locked in a variety of partially open positions. The rounded nose portion facilitates stud/receptacle alignment.

The cap member comprises a base portion including a turning means projecting therefrom. The cap portion may be of injection-molded plastic or stamped from sheet metal of suitable thickness and is adapted to hold the stud member. For instance, the base portion may be slotted to receive the laterally articulated stud head. The turning means may be adapted to be grasped by the fingers of the user and may be a cylindrical or polygonal projection extending upwardly from the base portion. Preferably the projection is formed to be easily gripped by hand or by an appropriate tool such as a plier. Alternatively, the exterior cap base face may be slotted to cooperate with a screwdriver tool or the cap portion itself may be fabricated in a cylindrical or polygonal configuration to directly accept rotational forces applied by hand or by an appropriate tool.

The cap may be substantially hollow to enclose the positioning spring which is connected between the cap and the first panel. Connection of the spring to the cap may be achieved by insertion of one end of the spring through a slot in the cap perimeter and the spring may be subsequently bent or that end of the spring may be riveted to the cap. The opposite spring end is attached to the first panel by either bending it around a suitable means such as an attached peg or alternatively by riveting it to the first panel.

The turn member positioning means, generally a spring, may be any resilient device which will reproducibly position the turn member at the preferred rotational orientation. Such positioning will ensure that the turn member engages the receptacle jaws upon closing the fastener. Further, the positioning means also resists rotational disengagement of the turn member from the receptacle jaws.

A first panel attachment means is any device which rigidly attaches to the stud body after the turn member has been inserted through the first panel to prevent the stud body from falling out of its panel. Consequently, the turn member is permanently associated with the first panel while still free to rotate on its axis. The attachment means may be a stamped member such as a formed "C" clip member.

The receptacle is a unitary member which may be stamped from sheet metal, preferably spring steel, and comprises a base having a double rectangular off-axis shaped opening for turn member insertion, the shape of the opening limiting the direction and degree the turn member may be rotated. The receptacle also has two downwardly articulated flanges which form the jaws and cooperate with the stud body. The flanges grip the stud body all along its length so that the panels may be partially separated and yet the fastener is joined together. The receptacle member may be appropriately fabricated to be attached to the second panel by means well known in the art, such as by rivets or screws.

Upon engagement of the first and second panels, the turn member is inserted through the opening at its pre-specified rotational position, causing the stud body to contact the downwardly articulated receptacle flanges and lock the fastener. Such a lock occurs even though the panels are partially separated. To unlock the fastener one rotates the turn member in the opening to thereby disengage the stud body from contact with the receptacle flanges, whereupon the turn member may be withdrawn from the receptacle and the first and second panels completely separated.

BRIEF DESCRIPTION OF THE DRAWINGS

Other features and objectives of the present invention will be apparent from the following detailed description of the invention which should be taken in conjunction with the accompanying drawing, which present the inventor's best mode of carrying out the present invention.

In the drawings:

FIG. 11 is a side cross-sectional view of another embodiment of the invention;

FIGS. 12 and 14 are perspective views of alternative embodiments of receptacles;

FIGS. 12a and 14a are cross-sectional views taken along the respective lines 12a and 14a and FIGS. 12 and 14 when they are assembled; and FIG. 13 is a perspective view of a spring used in the present invention.

DETAILED DESCRIPTION OF THE INVENTION

Figure 1:
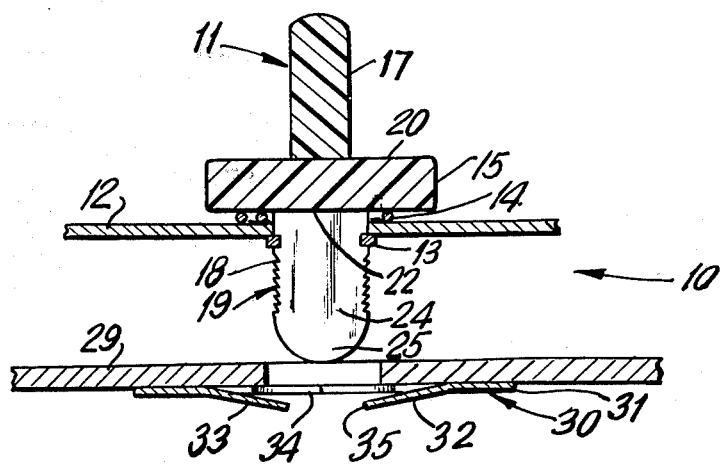
FIG. 1 is a side view of the fastener, partly in cross-section.

The bayonet locking type fastener of the present invention is shown in FIG. 1 and is generally designated as 10. The fastener 10 comprises the turn member 11 which is attached to the first panel 12 and a receptacle member 30 which is attached to a second panel 29. The turn member 11 comprises the cap 15 including the turning means 17, the stud 19, the turn member positioning means 14, and the first panel attachment means 13.

Figure 2:
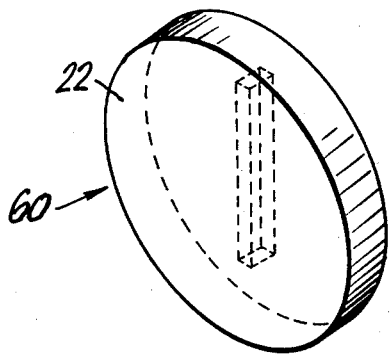
FIG. 2 is a perspective view of the solid turn member cap.
Figure 3:
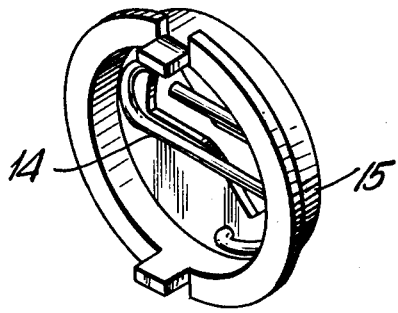
FIG. 3 is a perspective view of the hollow turn member cap.

The cap 15 may be of either hollow or solid construction (FIGS. 2,3) and may be stamped from sheet metal, injection-molded from plastic or formed from a metal block. The cap 15 functions as a shield between the turning means 17 and the turn member positioning means 14 and consequently protects the user from unnecessary and inadvertent contact with the internal fastener parts. In the hollow cap embodiment of this invention, shown in FIG. 3, the turn member positioning means 14 may be enclosed within the cap 15, so that it is not visible to the user and protected from damage.

Figure 4:
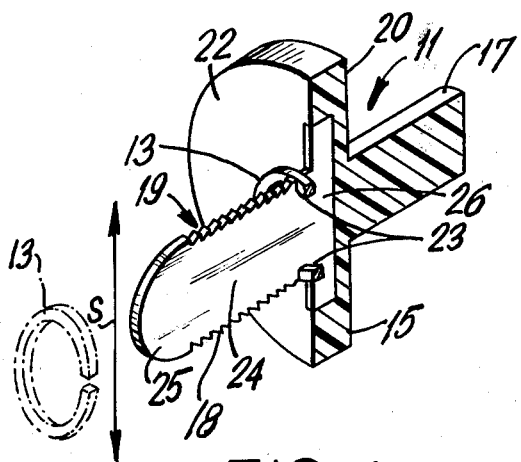
FIG. 4 is a perspective view, partly in cross-section, showing the turn member with a solid cap.
Figure 5:
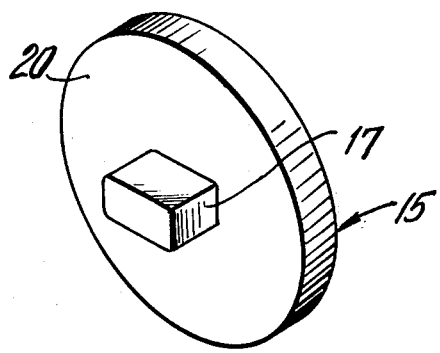
FIG. 5 is a perspective view of an embodiment of a cap having a polygonal turning means.
Figure 6:
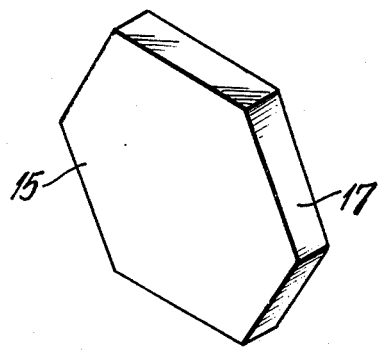
FIG. 6 is a top perspective view of an embodiment of a cap as a turning means.
Figure 7:
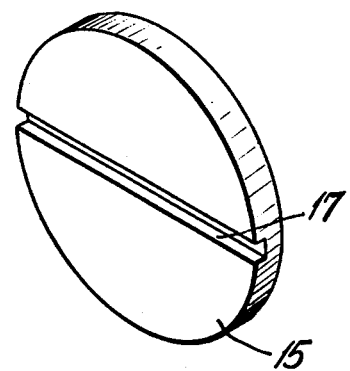
FIG. 7 is a top perspective view of an embodiment of a cap adapted to cooperate with a screwdriver.

The turning means 17 may be a suitable cylindrical or polygonal projection from the upper cap face 20 as in FIGS. 4 and 5, respectively, and may be formed as an integral one-piece unit with the cap 15. Alternatively as in FIG. 6, the cap 15 itself may be appropriately shaped to act as a turning means 17, having an external polygonal shape, which may be rotated by hand or by an appropriate tool such as a plier. Alternatively, as in FIG. 7, the turning means 17 may be a slot in the cap 15 which may be turned by a screwdriver or coin edge.

Figure 8:
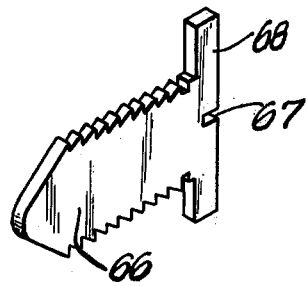
FIG. 8 is a perspective view of a stud.

Regardless of which embodiment of the turning means 17 is employed, the lower cap face 22 is adapted to fixedly hold the laterally disposed stud head 26, as shown in FIG. 4. For example, the solid cap 60 of FIG. 2 utilizes an indentation sufficient to frictionally accept and grip the stud head 26 or the cap may be injection-molded about the stud head 26. Another example of a turning means is shown in FIG. 8, which shows slot 67 in turning means 68.

The turn member 11 further comprises a stud member 19, shown in FIG. 4, which includes the laterally disposed head portion 26, the serrated shank portion 24, and the nose portion 25. Preferably the stud member is stamped or otherwise formed from sheet metal. The laterally disposed head portion 26 is adapted to fixedly fit within the lower cap face 22. The combination of cap 15 and stud 19 functions as a single unit, and rotation of the turning means will cause rotation of the stud member 19.

Upon insertion of the turn member 11 in the receptacle 30, the serrated stud edge 18 will engage and seat in the flanges 32,33 of the receptacle, establishing the lock of the fastener. The angular articulation of the receptacle flanges 32,33 complements the angular articulation of the stud edge serrations 18 and results in enhanced fastener lock.

The pre-stressed receptacle flanges 32,33 are preferably of resilient spring steel and resist spreading as the turn member is inserted. Consequently, these flanges 32,33 grip the shank portion 24 or 66. An attempt to axially withdraw the turn member 11 will move the flanges 32,33, frictionally dragged by the serrations of the shank portion 24 or 66, closer to the receptacle base 31. The closer the flanges 32,33 are to the base 31, the smaller the flange opening 35 and consequently the tighter the flanges will grip the stud, preventing axial withdrawal of the turn member.

The stud member 19 also includes a rounded or tapered nose 25 which facilitates insertion of the turn member 11 into the receptacle member 30. The nose 25 acts as a safety feature in that the exposed edge is blunt.

The turn member 11 may be attached to a first panel 12 by a first panel attachment means 13, which may be any device which will attach to the stud shank portion 24 and permit its rotation, for example, a stamped and formed "C" clip. The turn member 11 is inserted through the first panel 12 and the attachment means 13 is affixed to the protruding stud shank portion 24. Although the turn member 11 is permanently attached through the first panel 12, it is free to rotate with respect to it. The stud shank portion 24 may be grooved, as shown in FIG. 4, to provide a seat 23 for the attachment means 13. In FIG. 4 the attachment means ("C" clip) is shown in dot-dash lines prior to seating on shank portion 24 and in solid lines after being seated. The seat 23 should be at a distance from the laterally disposed head 26 and at a distance slightly greater than the thickness of the first panel 12.

The turn member 11 includes a turn member positioning means 14 which orients the turn member 11 in a pre-specified rotational position with respect to the flat panel. The turn member positioning means 14 may be a ribbon or clock-type coil spring, shown in FIG. 13, which is connected between the cap 15 and the first panel 12. Generally, the first spring end may be riveted or otherwise fastened to the cap 15 or it may be inserted in a slot in the cap perimeter and subsequently bent over. Alternatively, the first spring end may be wrapped around the lateral head 26 before it is inserted in the cap 15. The second spring end is attached to the first panel 12 by a rivet or other fastening device well known in the art.

The exact position of the second spring end should be chosen such that the lateral stud axis S (FIG. 4) will align with the longitudinal receptacle axis R (FIG. 9) when no rotational force is applied to turning means 17. Consequently, when the turn member 11 is inserted in the receptacle 30, the stud serrations 18 will engage the receptacle flanges 32,33 without realignment of the stud member. Further, the turn member positioning means 14 opposes rotational movement of the turn member 11 and thereby enhances the fastener lock.

The receptacle 30 is generally of rigid planar construction and may be fabricated from sheet metal, preferably spring steel. The receptacle 30 may be attached to a second panel 29 by devices well known in the art, such as screws or rivets. The receptacle 30 comprises a base 31 having a shaped opening 34 (FIG. 9) and two opposed downwardly articulated flanges 32,33.

Figure 9:
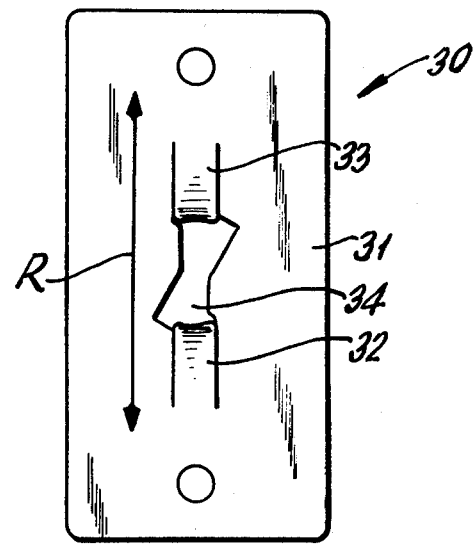
FIG. 9 is a top view of the receptacle shown in FIG. 1.

The shaped opening 34 generally includes the area subtended by two angularly disposed axes. The length of these axes is generally slightly greater than the lateral width of the shank portion 24. Opening 34, seen in top view, may also be described as a rectangular elongated opening having top and bottom opposite triangular portions. The opening formed by the axes must allow for sufficient rotation of the turn member 11 within the receptacle 30 to disengage the stud 19 from contact with the flanges 32,33. The angle is preferably about 30°. One of the axes of the opening 34 is preferably aligned with the longitudinal receptacle axis R (FIG. 9). The receptacle flanges 32,33 are similarly articulated along this axis R and may be stamped from the base 31.

Upon insertion of the turn member 11, the edge serrations 18 will engage the flanges 32,33 and effect a positive stud seating and fastener lock. The lock position is enhanced by the turn member positioning means 14 which opposes rotational movement of the turn member 11.

The fastener 10 is unlocked by application of an external rotational force on its turning means 17 sufficient to overcome the force of the positioning means 14. The external rotational force is applied to the turning means 17 in a direction which will cause the turn member 11 to move toward the non-aligned opening axis. More particularly, if the non-aligned axis is disposed in a clockwise direction, the external rotational force should be applied in a clockwise direction. Rotation of the turn member 11 will release the edge serrations 18 from engagement with the receptacle flanges 32,33 unlocking the fastener, permitting the turn member 11 to be withdrawn from the receptacle 30 and allowing the panels 12,29 to be separated.

An alternative receptacle 30a is shown in FIG. 11 in which a clip receptacle is adapted to be fastened along the edge of a second panel 29a. The receptacle 30a is preferably formed as one integral stamped member of sheet spring steel. It has a curved end 72 which acts like a clip to retain its top portion 73, having opening 74 pressed to one face of panel 29a and its bottom portion 75 pressed to the opposite face of panel 29a. The bottom portion 75 has integral flanges 32a,33a which act in the same manner as flanges 32,33 to retain the serrations of the stud.

A still further alternative receptacle 30b is shown in FIGS. 12 and 12a. In the receptacle 30b a box-like structure is formed by the opposite side walls 80,81 and the opposite side walls 82,83 and the bottom wall 84. The side walls 82,83 have flanges 85,86 which are protruded through the rectangular hole 87 in second panel 29b. The flanges then lie on the top face of the second panel 29b and the receptacle 30b is held in position by the outwardly directed spring action of the side walls 82,83. Preferably the receptacle 30b is stamped and formed of sheet metal spring steel. The flanges 32b,33b grip the stud in the same manner as flanges 32,33. A portion 88 (downwardly projecting portion in FIG. 12a) acts as a stop member to prevent rotation of the stud in one direction.

Another alternative receptacle 30c is shown in FIGS. 14 and 14a. That receptacle 30c has two opposed side walls 90,91 each of which has a respective resilient bent portion 92,93 which is bent outwardly. The bottom wall 98 of receptacle 30c permits the opposed side walls 90,91 to be temporarily squeezed together to fit the side walls 90,91 through the rectangular hole 99 in the second panel 29c. The side walls 90,91 flex outwardly and each bent portion 92,93 has a free edge, respectively 95,97, which fits against the bottom face of the second panel 29 and retains the receptacle 30c in position. As in the other receptacle embodiments, the receptacle 30c has flanges 32c,33c and is constructed as an integral one-piece member of a sheet metal spring steel.

Figure 10:
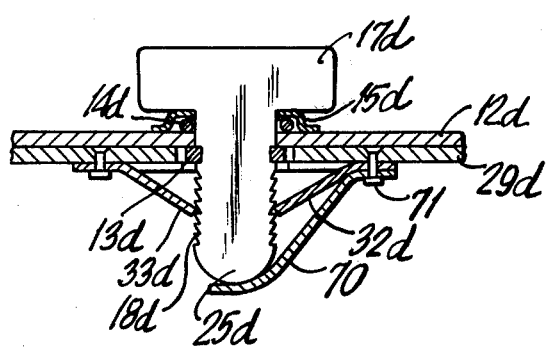
FIG. 10 is a side cross-sectional view of another embodiment of the fastener of the present invention.

Modifications may be made in the present invention within the scope of the subjoined claims. For example, as shown in FIG. 10, a spring arm may be used to separate the joined panels after the turning means has been rotated by the user to free serrations from the flanges. In FIG. 10 the parts corresponding to the previously labeled parts are labeled with the letter "d" and the corresponding number. The spring arm 70 is attached by rivet 71 to the second panel 29a.

What is claimed is:

1. A locking type fastener comprising a turn member assembly attached to a first panel and a receptacle member attached to a second panel;

said turn member assembly including a cap attached to said first panel, a turn member rotatably mounted relative to said cap, a turn member spring positioning means to resiliently and rotationally orient said turn member with respect to said first panel by returning said turn member to a preselected position after unlocking of said fastener;

said turn member assembly further including a first stop means to limit the rotation of said turn member to no more than one-quarter turn in the direction it unlocks said fastener and a second stop means to limit the return of said turn member by said spring positioning means upon unlocking said fastener so that said turn member returns to its preselected position to be relocked;

said turn member including a turning means to rotate said turn member and a stud having a body portion, said stud body portion being an elongated sheet metal body member with flat opposed sides, parallel opposed serrated edges and a blunt nose portion, said turn member further including panel attachment means to rotatably attach said stud to said first panel;

said receptacle member comprising a base, two downwardly articulated spring flanges connected to said base and having free edges, an elongated opening through which the stud body portion protrudes on fully closing the fastener and which limits the rotational turning of said stud body portion, and means for securing said receptacle to said second panel;

wherein on partial or full closing of said first panel to said second panel said stud is inserted through said opening to bend said flanges downwardly, thereby permitting said free edges of said flanges to grip the serrated edges of said stud body portion; and wherein on turn member rotation said body portion will disengage from said flanges producing fastener unlock and permitting withdrawal of said turn member from said receptacle and consequent panel separation.

2. A fastener as in claim 1 wherein said panel attachment means to rotatably attach said stud is a "C" spring.

3. A fastener as in claim 1 wherein said turn member spring positioning means is a ribbon-type spring connected near one of its ends to said first panel and connected near its opposite end to said stud.

4. A fastener as in claim 1 wherein said first and second stop means are formed by the side walls of an opening in said cap through which said turn member protrudes.

5. A fastener as in claim 1 wherein said cap is of hollow construction and said spring positioning means is within the hollow of said cap.

6. A locking type fastener comprising a turn member assembly attached to a first panel and a receptacle member attached to a second panel;

said turn member assembly including a cap attached to said first panel, a turn member rotatably mounted relative to said cap, a turn member spring positioning means to resiliently and rotationally orient said turn member with respect to said first panel by returning said turn member to a preselected position after unlocking of said fastener;

said turn member assembly further including a first stop means to limit the rotation of said turn member to no more than one-quarter turn in the direction it unlocks said fastener and a second stop means to limit the return of said turn member by said spring positioning means upon unlocking said fastener so that said turn member returns to its preselected position to be relocked;

said turn member including a turning means to rotate said turn member and a stud having a body portion, said stud body portion being an elongated sheet metal body member with flat opposed sides, parallel opposed serrated edges and a blunt nose portion, said turn member further including panel attachment means to rotatably attach said stud to said first panel;

said receptacle member comprising a base, two downwardly articulated spring flanges connected to said base and having free edges, an elongated opening through which the stud body portion protrudes on fully closing the fastener and which limits the rotational turning of said stud body portion, and means for securing said receptacle to said second panel;

wherein said receptacle opening is substantially shaped as two overlying rectangles having offset axes;

wherein on partial or full closing of said first panel to said second panel said stud is inserted through said opening to bend said flanges downwardly, thereby permitting said free edges of said flanges to grip the serrated edges of said stud body portion; and wherein on turn member rotation said body portion will disengage from said flanges producing fastener unlock and permitting withdrawal of said turn member from said receptacle and consequent panel separation.

* * * * *